United States Patent [19]

Wilhelm et al.

[11] Patent Number: 4,554,787
[45] Date of Patent: Nov. 26, 1985

[54] SUPERCHARGED INTERNAL COMBUSTION ENGINE

[76] Inventors: Camille Wilhelm, 8, rue du Ruisseau Bleu, 67100 Strasbourg-Neudorf; Camille Wilhelm, 107, rue des Pres, 67380 Lingolsheim; Robert Wilhelm, 7, rue de Rangen, 67200 Strasbourg-Cronenbourg, all of France

[21] Appl. No.: 384,658

[22] Filed: Jun. 3, 1982

[30] Foreign Application Priority Data

Jun. 3, 1981 [FR] France .................. 81 11121
Nov. 23, 1981 [FR] France .................. 81 22013

[51] Int. Cl.⁴ ............................................ F02B 37/00
[52] U.S. Cl. ........................ 60/605; 60/39.44; 60/624; 60/729; 123/45 A; 123/559
[58] Field of Search ............. 60/624, 39.44, 729, 60/39.75, 605; 123/45 R, 45 A, 559

[56] References Cited

U.S. PATENT DOCUMENTS

| 890,208 | 6/1908 | Arnsburger | 60/39.44 |
| 2,410,958 | 11/1946 | Brockhurst | 123/45 R |
| 3,750,630 | 8/1973 | Hariman | 123/45 A |
| 3,757,748 | 9/1973 | Arney | 123/45 A |

FOREIGN PATENT DOCUMENTS

| 587255 | 7/1928 | Fed. Rep. of Germany . | |
| 2552575 | 2/1977 | Fed. Rep. of Germany . | |
| 402844 | 10/1909 | France . | |
| 559631 | 9/1923 | France . | |
| 2131788 | 11/1972 | France . | |
| 37531 | 3/1980 | Japan | 123/45 A |

Primary Examiner—Douglas Hart
Attorney, Agent, or Firm—Young & Thompson

[57] ABSTRACT

A supercharged internal combustion engine, characterized in that it is constituted by a cylinder (1) comprised by two identical portions, assembled together, symmetrical with respect to an axis perpendicular to its longitudinal axis, and traversed along this longitudinal axis by an engine shaft (3). Two reciprocating rotating pistons (4) are guided in the cylinder (1) and on the engine shaft (3), and driving the latter in rotation. Two explosion chambers (5) are located each at an end of the cylinder (1), on its periphery, in each of which moves a reciprocating piston (6), and into which empties a carburation injector. A turbocompressor (8) driven mechanically by the engine shaft, has air outlets (9) which are connected to the inlet tubing (10) of each portion of the cylinder (1), and two valve controlled escape orifices (11) are connected each to a tubular outlet (12).

8 Claims, 6 Drawing Figures

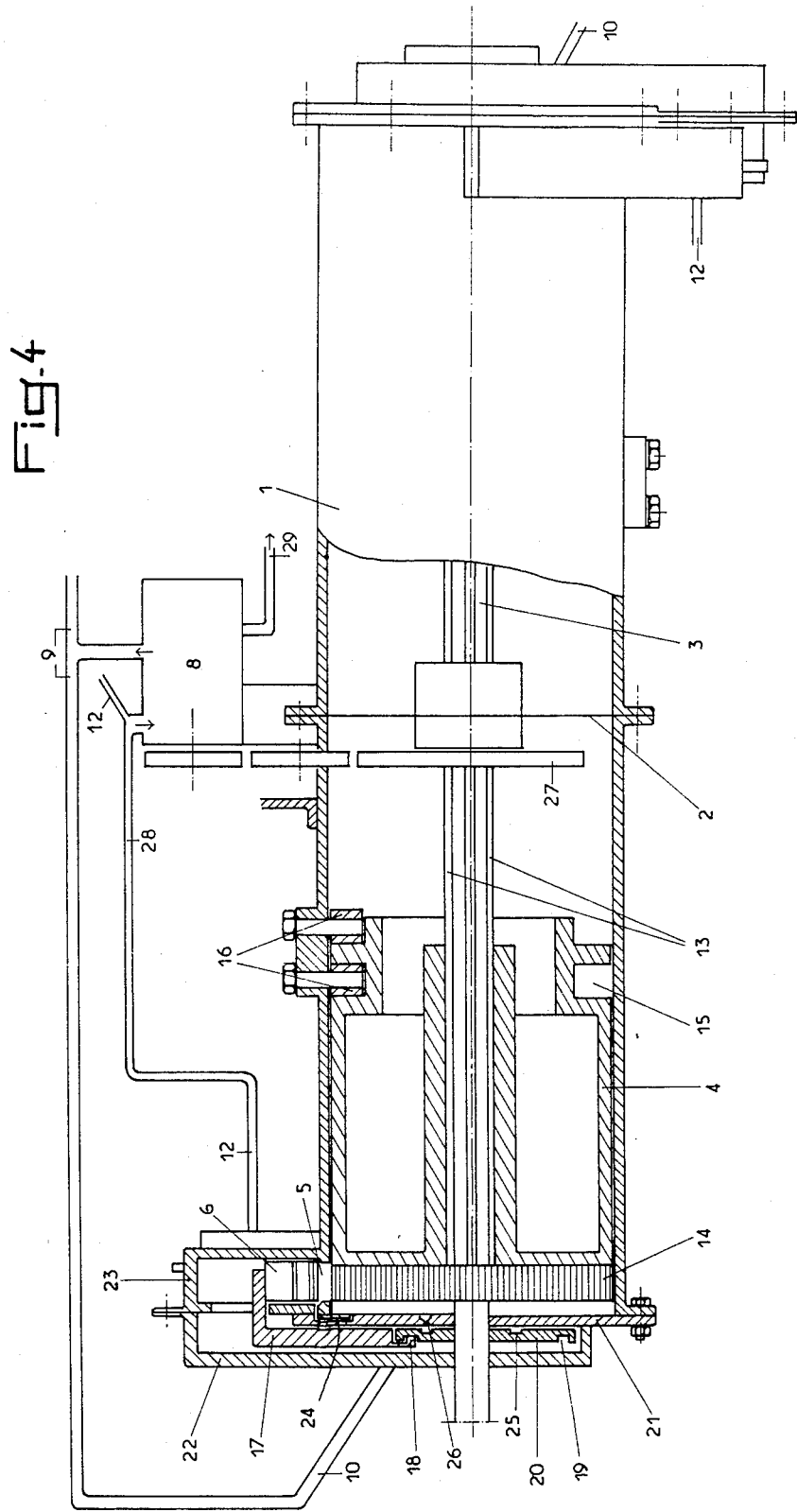

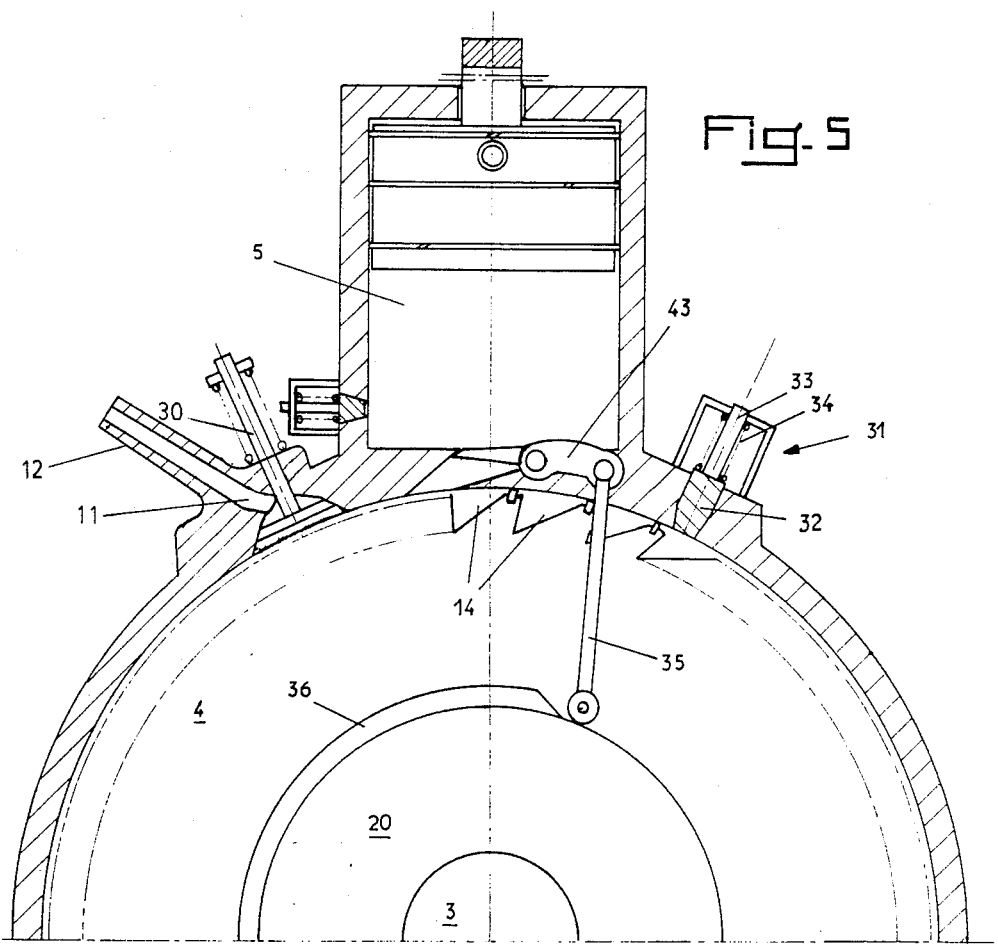
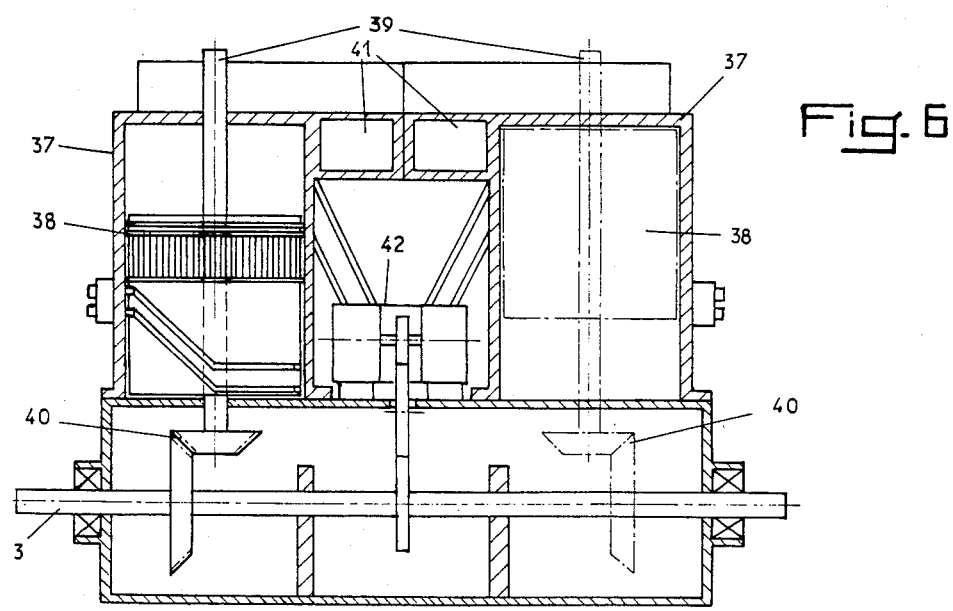

SUPERCHARGED INTERNAL COMBUSTION ENGINE

The present invention relates to the field of heat engines, particularly internal combustion engines, and has for an object such an engine which is supercharged.

At present, the existing engines of this type are generally provided with a compressor or a turbocompressor mechanically driven or driven by means of exhaust gas, and having cylinders which can be arranged in various ways, and in which reciprocating pistons move which are connected to a transmission system.

However, in these known engines, the economical field of use, which is to say the maximum energy production, is very narrow, and only their high-performance use is advantageous.

Moreover, these known motors are subject to rapid wear of their moving parts by virtue of the operating temperatures and pressures.

The object of the invention is to overcome these disadvantages.

Thus, it has for its object a supercharged internal combustion engine characterized in that it is constituted by a cylinder formed by two identical portions, assembled together, symmetric about an axis perpendicular to its longitudinal axis, and transected along this longitudinal axis by an engine shaft, by two rotating reciprocating pistons guided in the cylinder and on the engine shaft, and driving the latter in rotation, by two explosion chambers disposed each at one end of the cylinder, about its periphery, in each of which a reciprocating piston moves, and into which feeds a carbureting injector, by a turbocompressor mechanically driven by the engine shaft, and whose air outlets are connected to intake tubes of each portion of the cylinder, and by two valve-controlled outlet orifices connected each to a tubular outlet, the cylinder being surrounded, in a manner known per se, by forced air or water refrigeration means.

According to a variant form of the invention, the drive of the turbocompressor is an automatically disconnectible drive and coupled to a turbine driven by exhaust gases issuing from each part of the cylinder, such that, upon the achievement of a sufficient pressure and drive speed, the drive is no longer from the engine shaft.

According to another characteristic of the invention, each portion of cylinder is provided with an adjustable safety valve disposed facing the explosion chamber, substantially symmetrically with the exhaust valve, and adapted to avoid undesirable supercharging in case of non-functioning or misfunctioning of the exhaust valve.

According to another modified form of the invention, the cylinders and pistons are disposed perpendicular to the engine shaft and are coupled to the latter by secondary engine shafts and by bevel gearing, and their operating cycles are staggered, and their explosion chambers are each fed by a turbine of a double turbine turbocompressor with disconnectible mechanical drive and by exhaust gases.

The invention will be better understood from the following description, which relates to preferred embodiments, given by way of non-limiting example, and explained with reference to the accompanying schematic drawings, in which:

FIG. 4 is a side elevational view of an engine provided with a disconnectibel turbocompressor;

FIG. 5 is a cross sectional and front elevational view of the engine of FIG. 4, and FIG. 6 is a side elevational and cross-sectional view of a modified form of the invention.

Figure 1:
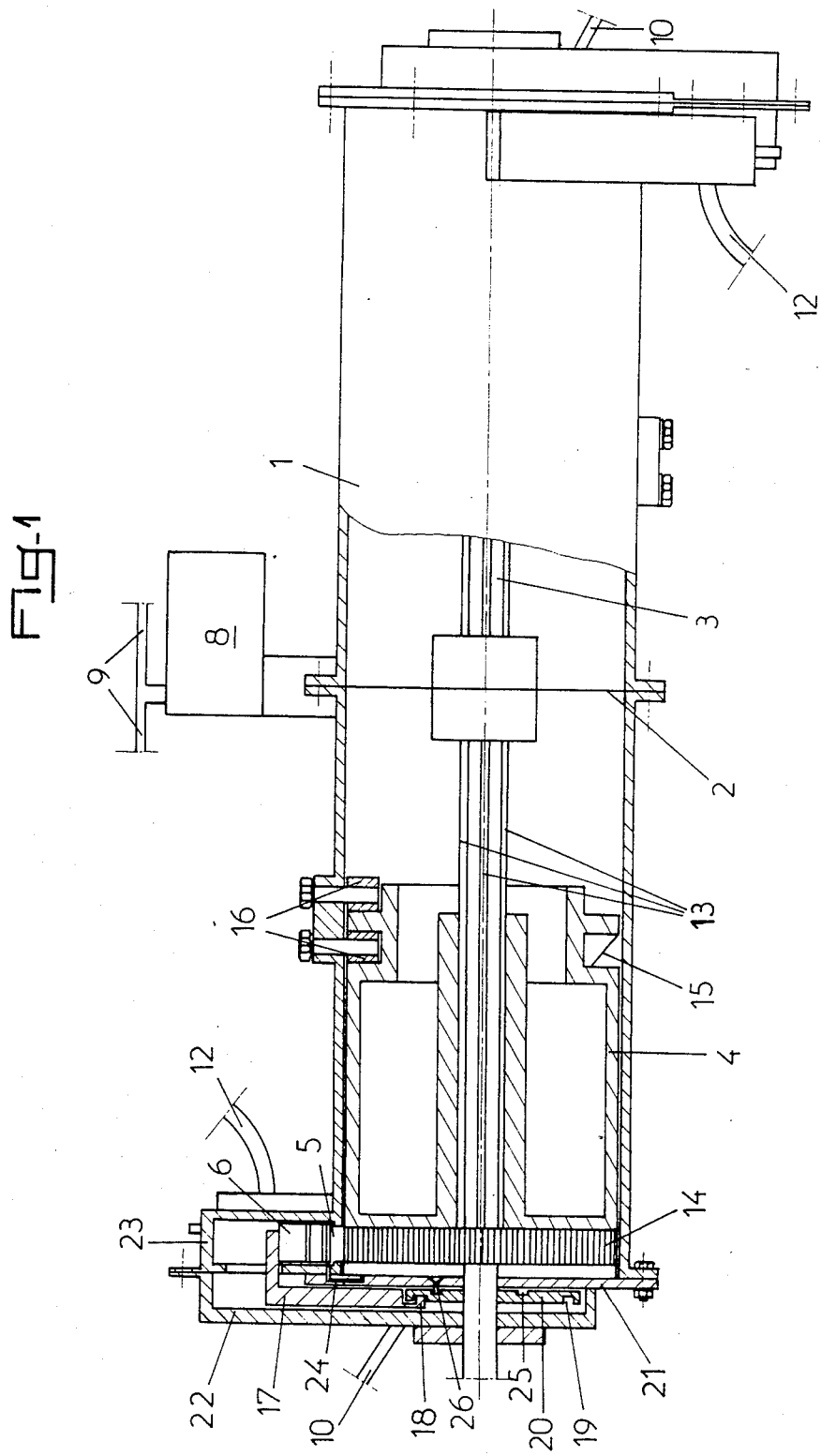
FIG. 1 is a side elevational view, partially in section, of an engine according to the invention.
Figure 2:
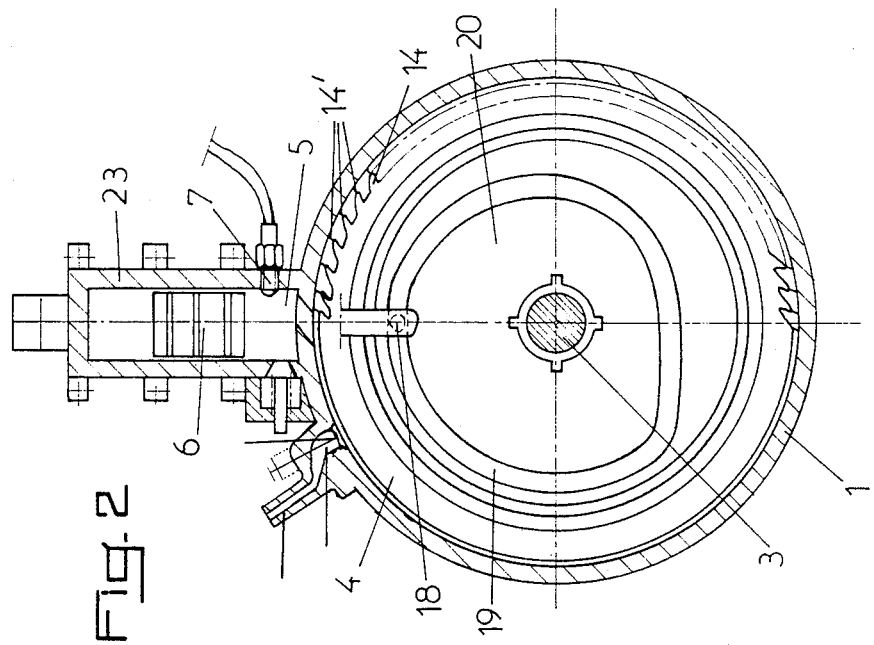
FIG. 2 is a front elevational and cross-sectional view of the engine of FIG. 1, on a larger scale.
Figure 3:
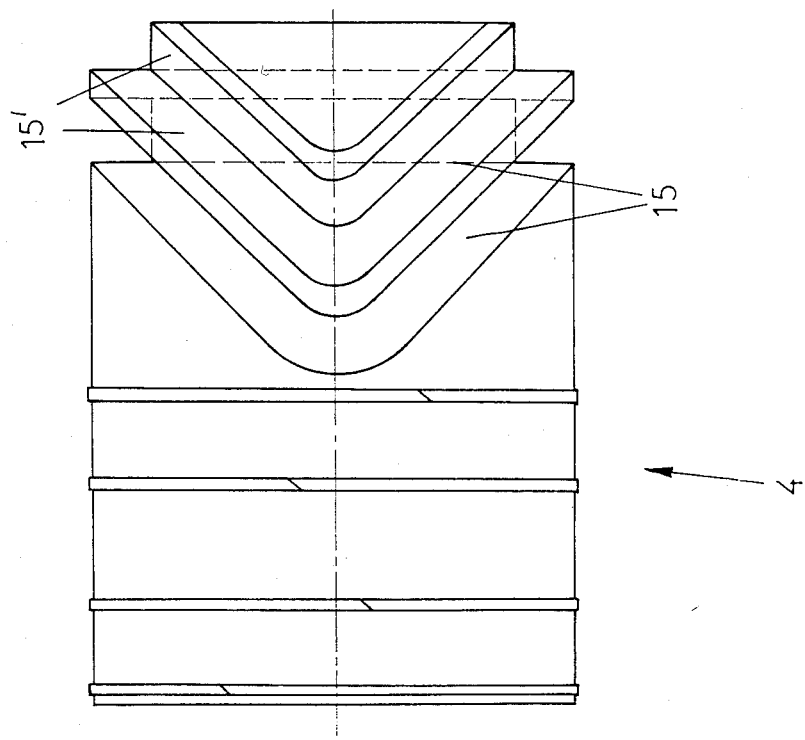
FIG. 3 is a side elevational view of a reciprocating rotating piston, also on a larger scale.

According to the invention, and as is shown more particularly, by way of example, in FIGS. 1 and 2 of the accompanying drawings, the supercharged internal combustion engine is essentially constituted by a cylinder 1 formed in two identical parts assembled together along a joint 2 and symmetrical with respect to this joint, by a drive shaft 3 extending coaxially in the interior of cylinder 1 and carrying two reciprocating and rotating pistons 4, which are guided in the interior of cylinder 1 and on drive shaft 3, and drive the latter in rotation.

At each end, cylinder 1 is provided with an explosion chamber 5, disposed on its periphery, in which a reciprocating piston 6 moves, and into which opens a carbureting injector 7. On the central portion of cylinder 1 is mounted a turbocompressor 8, which is mechanically driven by engine shaft 3, and whose air outlets 9 are connected to inlet tubing 10 of each portion of the cylinder, which is provided, moreover, with a valve-controlled outlet opening 11 connected to a tubular outlet 12. Cylinder 1 and the explosion chambers 5 are moreover surrounded in a manner known per se, by a forced air of water cooling means, not shown.

The pistons 4 are rotatably fixed to the shaft 3 and translatably displaceable by a splined connection 13, or by tongue and groove, or any other rotatable connection permitting translation.

Near its end facing the end of cylinder 1, each piston 4 has vanes 14 about half its circumference, and at its opposite end on the diametrically opposed peripheral portion, the piston is provided with at least one and preferably two identical curvilinear sections 15 comprising cams for the reciprocating displacement of piston 4 in cooperation with two fixed guides 16 of cylinder 1.

The piston 6 of compression chamber 5 is fixed to one end of a cranked rod 17 whose other end is in the form of a lug 18 engageable in a curvilinear groove 19 of a cam disc 20 fixed to the engine shaft 3.

On the side of disc 20 opposite to that carrying groove 19, disc 20 is provided with a circular groove 25 carrying on a portion of its circumference an actuating cam for a valve 26 connected to the tubing 10 and through which combustion air is injected into the cylinder 1 when piston 4 is retracted.

Cylinder 1 is closed at its two ends by a gastight closure plate 21, and cam disc 20 as well as cranked rod 17 are disposed beyond this plate in a gastight casing 22 connected to cylinder 23 of the compression chamber 5.

The turbocompressor 8 is driven, preferably with speed multiplication, by engine shaft 3 by means of a gear train passing through cylinder 1 at the level of joint 2.

The vanes 14 of each piston 4 are cut into the end of the pistons so as to define between each two consecutive vanes a chamber whose open portion is closed by the interior surface of cylinder 1, and whose gastightness is ensured by sealing strips 14' provided on each crest of the vanes. The total volume enclosed by the vanes corresponds to the volume of the explosion chamber 5 at the time of said explosion, whereby the combustion gases, which then expand, act on each individual chamber thus defined so as to effect rotation of the pistons 4 in a counterclockwise direction (FIG. 2). During a half turn, the pistons 4 turn on themselves without translation, being guided by the semi-circular grooves 15' connecting the ends of the grooves 15. Then the pistons 4 displace in translation toward joint 2 of cylinder 1, the gases remaining in the vanes.

Simultaneously with the rotation of the pistons 4 and the expansion of the gases within the vanes 14, the pistons 6 of chambers 5 are displaced in the direction of the cylinder 1 by rods 17 under the action of disc 20 and the outlet valves remain closed.

The combustion air is brought to the interior of the cylinder 1 during translation of the pistons 4 in the direction of the joint 2. After a quarter turn of the pistons 4, which brings them to the rear dwell position, the pistons will move back in the direction of the closure plates 21 and effect a further compression of air in chamber 5, which is connected to the internal surface of the closure plate 21 by an auxiliary connecting channel 24 permitting the passage of all the air contained in the cylinder 1 toward chamber 5. Another explosion then takes place and the pressure generated is added to that between the vanes, and the outlet valve is controlled to open to permit the passage of gases through the outlet tubing 12. The outlet valve then remains open for 270° of rotation of the pistons 4.

The control of the outlet valves is effected in such a way that the latter open during a rotation of 270° of pistons 4 in both cycles. Moreover, the seats of these valves are provided with scavenging openings for cooling air from auxiliary tubing connected to the air outlets of turbocompressor 8.

Thus, during exhaust, the seat and the vanes are continuously swept by fresh air, and during the consecutive admission of air, supplemental combustion air is injected in cylinder 1.

According to a modified form of the invention, it is possible to provide an engine constituted by several cylinders 1 disposed side-by-side and whose engine shafts are interconnected mechanically and/or by a principal transmission shaft, the piston cycle for each cylinder being then advantageously staggered relative to that of the other pistons so as to obtain greater flexibility of operation.

According to another modified form of the invention, and as shown in FIG. 4 of the accompanying drawings, turbocompressor 8 driven mechanically by means of a motion-multiplying train 27 is provided, moreover, with inlet tubing 28 for gases exhausted from the two portions of the cylinders, connected to the outlet tubing 12 of these portions, and directing said outlet gases to a drive turbine of the compressor 8, these gases being exhausted through tubing 29.

Thus, at low pressures and speeds of the exhaust gases, available when the engine turns slowly, turbocompressor 8 is driven by means of a motion-multiplying train 27, and upon achievement of sufficient pressure and drive speed, said drive is no longer effected mechanically by the engine shaft, but by means of the drive turbine of the turbocompressor 8.

The uncoupling of gear train 27 may be effected either completely mechanically, for example by freewheel mounting of one of the gears of train 27, or by an electromagnetic clutch actuated by a manometric contact, or the like.

So as to avoid undesirable supercharging, particularly in the case of non-operation of misoperation of the exhaust valve 30, there is provided, as shown in FIG. 5, on each portion of the cylinder, a safety valve 31 disposed in front of the explosion chamber 5, substantially symmetrically to the exhaust valve 30, and adjustable, either manually, or by means of an electrically or electronically controlled device as a function of the pressures arising in the chambers 14 of the pistons 4. Each valve 31 is constituted by a valve body 32 having a trapezoidal section with its large base facing outwardly, permitting easy opening under the effect of pressure, by a guide rod 33, and by a return spring 34 whose force may be adjusted in known manner, during operation or when the motor stops.

Moreover, according to another characteristic of the invention, between the explosion chamber 5 and the interior of cylinder 1, there is provided a swinging valve 43 (FIG. 5) for closing the outlet orifice of chamber 4 resisting the pressure of the combustion gas against the action of a return spring (not shown), and actuating when open at least one rod 35 cooperating with an opening cam 36 provided in the sealed casing 22 on the disc 20 driven by the engine shaft 3, this cam 36 effecting swinging upon opening of the valve 43 through a rotation of 180° of the pistons 4, that is to say during the intake and filling phase of the chamber 5, the pressure of the gases after explosion effecting momentary opening of the valve 43 to the passage of the chamber defined by two successive ones of the vanes 14 confronting the opening of the chamber 5.

FIG. 6 shows another embodiment of the invention, in which two cylinder and piston assemblies 37, 38 are disposed perpendicular to the engine shaft 3 and are coupled to the latter by means of secondary engine shafts 39 and bevel gearing 40, and their operational cycles are staggered. The explosion chambers 41 of these cylinder and piston assemblies 37, 38 are fed each by a compressor of turbocompressor 42 which is a double turbine or the mechanically disengageably driven type and by the aforesaid exhaust gases.

In this embodiment, the arrangement of the various elements of a portion of the cylinder remains identical to that described with respect to the first embodiment, only the relative position of the pistons 38 in the cylinders 37 being different. Thus, in such a construction, one of the pistons may be in a raised explosion and discharge position while the other is in a lowered admission position for admission of combustible mixture, such that there is obtained an operating cycle which is more regular with less generation of vibration, the cycle without intake and compression of one of the pistons being compensated by the explosion and discharge working cycle of the other piston.

Thus, there is provided constant force on the engine shaft 3 during a complete rotation of the pistons 38 without shocks due to the inertia of the moving parts, whereby a flywheel is not needed, and great flexibility of operation is achieved.

According to another characteristic of the invention, it is possible to arrange several cylinder-piston assemblies perpendicular to the engine shaft, aligned in a V, flat, or radially, these assemblies being fed by one or more disconnectible mechanically driven turbocompressors and by the exhaust gases, the piston cycle being staggered between the individual cylinders, or groupwise by cylinders.

By such an arrangement, the versatility of the engine may be increased, as well as its mechanical output.

It is also possible, according to another characteristic of the invention, to control the injection device by means of speed reduction means so as to provide for the injection of carburation in explosion chamber 5 during both turns. Thus, during the first passage of chamber 14 of the pistons before the explosion chambers 5, said chamber alone is filled with compressed combustion air, which is mixed with the explosion gases during the second passage and promotes better combustion of the latter, whereby the energy output of the engine is improved.

Thanks to the invention, it is possible to provide a supercharged combustion engine permitting the obtention of optimum output no matter what the program, and in which vibration is suppressed to a large measure because the pistons operate in symmetry.

Moreover, by virtue of the construction and mode of operation of the engine according to the invention, the cylinder and piston assemblies cannot become ovalized, in contrast to known reciprocating piston engines.

Of course, the invention is not limited to the described embodiments shown in the accompanying drawings. Modifications are possible, particularly with respect to the construction of various elements, or the substitution of technical equivalents without thus departing from the scope of protection of the invention.

What is claimed is:

1. A supercharged internal combustion engine comprising a cylinder formed of two identical portions assembled together symmetrically about an axis perpendicular to the longitudinal axis of said cylinder portions, an engine shaft extending along said axis, two reciprocating rotating pistons in the cylinder on the engine shaft and slidably but non-rotatably mounted on the engine shaft, an explosion chamber disposed at each end of the cylinder and communicating with the cylinder, carburetor means for injecting a combustible mixture into each explosion chamber, a turbo-compressor driven by the engine shaft and having air outlets connected to air inlets at each end of the cylinder, and means responsive to explosions in the explosion chamber to rotate the pistons in said cylinder thereby to rotate said engine shaft.

2. An engine as claimed in claim 1, and on one end of each piston in the cylinder a series of vanes, each series extending halfway about the circumference of the associated said piston, each said piston having at its end opposite said vanes curvilinear portions comprising displacement cams for the piston, and fixed guides on the interior of the cylinder with which said cams coact to reciprocate the cylinder.

3. An engine as claimed in claim 1, and a piston in said explosion chamber secured to one end of a crank rod whose other end carries a lug engaging in a curvilinear groove in a cam disc secured to said engine shaft thereby to ensure reciprocation of said further piston in synchronism with rotation of said engine shaft.

4. An engine as claimed in claim 1, and escape valves for the escape of gases from the ends of the pistons, said escape valves being open during a rotation of 270° of the pistons.

5. An engine as claimed in claim 1, and a disc mounted for rotation on and with the engine shaft, said disc having thereon cam means for actuating a valve connected to an inlet for air from said supercharger.

6. An engine as claimed in claim 1, in which said turbo-compressor has a drive which is automatically disconnectible and is coupled to a turbine actuated by exhaust gas issuing from each end of the cylinder, whereby when sufficient drive speed and pressure are achieved, the turbo-compressor drive is no longer actuated by the engine shaft.

7. An engine as claimed in claim 1, there being a plurality of cylinder and piston assemblies disposed perpendicular to the shaft and coupled to the shaft by secondary engine shafts and bevel gearing, said assemblies having operating cycles that are staggered relative to each other.

8. An engine as claimed in claim 6, in which said turbo-compressor is mechanically driven by means of a speed increase train and has inlet tubing for exhaust gases from both ends of the cylinders.

* * * * *